Patented Jan. 15, 1946

2,393,086

UNITED STATES PATENT OFFICE 2,393,086

METHOD AND COMPOSITION

Euclid W. Bousquet, Wilmington, Del., assignor to E. I. du Pont de Nemours & Company, Wilmington, Del., a corporation of Delaware No Drawing. Application November 28, 1944, Serial No. 565,568

3 Claims. (Cl. 167—45)

This invention relates to the control and destruction of weeds by providing a new and effective class of herbicides. More particularly, it relates to the use of trichloroacetic acid and its salts as weed killers.

A variety of chemical substances have been suggested for use in the control and destruction of weeds. All of these materials, however, suffer from one or more disadvantages such as corrosiveness, inflammability, high toxicity, lack of selectivity, and others. This invention has as an objective the provision of a new class of herbicides free from most of the above disadvantages.

These objectives are accomplished by applying trichloroacetic acid or its salts to the foliage. By spraying the foliage with an aqueous solution of trichloroacetic acid or a trichloroacetic acid salt, especially ammonium trichloroacetate, it has been found possible effectively to control a wide variety of weeds, without most of the disadvantages characteristic of other weed killers.

The trichloroacetates are particularly valuable for weed control since they act rapidly and effectively, they do not support combustion, and they can be applied without danger of long-time soil sterilization. In addition, their corrosive action and toxicity are of a relatively low order.

The invention is further illustrated by the following examples in which parts are by weight.

Example 1

Plots of the land 50 square feet in area and covered with mixed annual weeds are sprayed with 3% aqueous solutions of trichloroacetic acid in amounts corresponding to 436 and 87 lb./acre respectively. After 1 day, 100% of the weeds had been killed by the higher concentration of acid, 70% by the lower. After 62 days the percentages of kill amounted to 100% and 80% respectively.

Example 2

As in Example 1, a small plot of weed-covered land is sprayed with a 3% aqueous solution of trichloroacetic acid in an amount corresponding to 25 lb./acre. After 3 days, 60% of the weeds were observed to be killed; the percentage of kill after 30 days amounted to 50%.

Example 3

A plot (100 square feet) of Johnson grass is sprayed with a gallon of aqueous solution containing 0.8 lbs. of ammonium trichloroacetate. The plot was observed after 2 months, substantially 100% of the tops were gone with no resprouts.

Example 4

A plot (100 square feet) of poison ivy is sprayed with a gallon of aqueous solution containing 1 lb. of ammonium trichloroacetate. A few days later it was noted that the leaves and stalks were completely killed.

Example 5

A plot (100 square feet) of honeysuckle is sprayed with a gallon of aqueous solution containing 1 lb. of ammonium trichloroacetate. After 24 hours the plants were considerably "burned," after 20 days it was noted that all tops were killed.

It is not intended that this invention shall be limited to the examples listed above. For example, while the ammonium trichloroacetate is generally preferable for most herbicidal applications, a wide variety of other salts such as the sodium, potassium, calcium, magnesium, aluminum, iron, zinc, and the organic salts such as the aniline, mono-, di- and trimethyl ammonium, ethyl ammonium, dodecyl ammonium, etc., may be employed.

The compositions of this invention are useful as general purpose herbicides for destroying the foliage of, or for killing annuals, perennials, succulent or woody plants and are particularly useful for the control of broad leaf weeds, especially the succulent annuals, and for defoliating crop plants such as soy beans and cotton.

The trichloroacetates are applicable to weed control in various combinations, whether alone or with other special ingredients to give enhanced physical properties such as hygroscopicity, easy flowability, wetability, or herbicidal selectivity. They may be used also in connection with other weed-killing materials, for example, in admixture with ammonium sulfamate, ammonium thiocyanate, oil-refinery residues, and other commonly used weed killers.

Instead of applying the trichloroacetates from aqueous solution they may be applied as such or formulated into a suitable granular or dusting composition. When applied in this manner, water is picked up from the foliage, the ground, or the atmosphere to provide a solution of the chemical which translocates in the plant or infuses in the soil. Effective results are obtained by applying such compositions to the plants covered with dew.

In applying the trichloroacetates as such or in dusting compositions it is desirable to include a small quantity of a substance having high affinity for water; thus, such hygroscopic materials as calcium chloride, zinc chloride, glycerol, glycol, and ammonium thiocyanate may be included with beneficial results.

When the trichloroacetate is applied as such, either in granular form or as a dusting composition, it is desirable in some cases to include basic materials or fertilizers commonly used in conditioning soils in order to offset the tendency of the trichloroacetates to cause soil sterilization.

In dust preparations, it is frequently an advantage to include finely divided inert substances such as calcium carbonate, talc, bentonite, sodium sulfate, and like water-soluble or water-insoluble conditioning material. In aqueous solutions, wetting agents such as sodium lauryl sulfate, sodium salts of alkyl or alkylnaphthalene sulfonic acids, long-chained carbon or nitrogen-substituted betaines, and long-chained quaternary ammonium salts may sometimes be advantageously included. Similarly, hygroscopic materials, as noted above, may also be included in an aqueous solution with or without a wetting agent.

Aqueous solutions may be applied in a very wide range of concentrations depending upon the particular type of weed and its susceptibility to the toxicant. Generally, concentrations ranging from one to twenty per cent will be found satisfactory.

Some of the trichloroacetates may suitably be applied in aqueous dispersions or in aqueous emulsions especially if the trichloroacetate has but limited solubility. Special suspensions or emulsions may at times be desirable, for example, an emulsion of trichloroacetic acid or its salts may be prepared with suitable oils, such as oil-refinery residues, where the oil may add to the herbicidal properties of the composition. Oil soluble trichloroacetates may be applied in solution in such oils.

In these and other respects the compositions and methods of the invention may be varied without departing from the spirit and scope of the invention as set forth in the appended claims.

1. The method of controlling weeds which comprises contacting the weed with an aqueous solution of ammonium trichloroacetate.

2. The method of controlling weeds which comprises contacting the weed with ammonium trichloroacetate containing a hygroscopic substance.

3. A composition of matter for killing weeds comprising ammonium trichloroacetate and a hygroscopic substance.

EUCLID W. BOUSQUET.